(12) United States Patent
Kupferman

(10) Patent No.: US 6,882,486 B1
(45) Date of Patent: Apr. 19, 2005

(54) DISK DRIVE COMPRISING ASYNCHRONOUS/SYNCHRONOUS GAIN CONTROL FOR FAULT TOLERANT DETECTION OF SERVO SYNC MARK AFTER HEAD SWITCH

(75) Inventor: Hanan Kupferman, Diamond Bar, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 399 days.

(21) Appl. No.: 10/112,197

(22) Filed: Mar. 29, 2002

(51) Int. Cl.[7] .................................... G11B 5/09
(52) U.S. Cl. ..................... 360/51; 360/46; 360/67
(58) Field of Search ....................... 360/51, 46, 65, 360/67, 77.08

(56) References Cited

U.S. PATENT DOCUMENTS

| 5,438,460 | A | 8/1995 | Coker et al. |
|---|---|---|---|
| 5,966,258 | A | 10/1999 | Bliss |
| 5,969,895 | A | 10/1999 | Ueda et al. |
| 6,067,206 | A | 5/2000 | Hull et al. |
| 6,111,710 | A | 8/2000 | Feyh et al. |
| 6,175,458 | B1 | 1/2001 | Carlson |
| 2002/0109932 | A1 * | 8/2002 | Aikawa et al. .......... 360/77.04 |

* cited by examiner

Primary Examiner—Sinh Tran
Assistant Examiner—Varsha A. Kapadia
(74) Attorney, Agent, or Firm—Milad G. Shara, Esq.; Howard H. Sheerin, Esq.

(57) ABSTRACT

A disk drive is disclosed comprising a plurality of disk surfaces and a plurality of respective heads actuated radially over the disk surfaces. Each disk surface comprises a plurality of tracks, each track comprising a plurality of data sectors and a plurality of embedded servo sectors, each embedded servo sector comprising a servo sync mark for synchronizing to the embedded servo sector. When the disk drive switches heads, a detection window for detecting the servo sync mark is opened early. An asynchronous gain control algorithm prevents a gain control system from diverging while reading an area of the disk surface preceding the servo sync mark, and a synchronous gain control algorithm maintains a proper gain of the read signal while reading the servo sync mark.

14 Claims, 5 Drawing Sheets

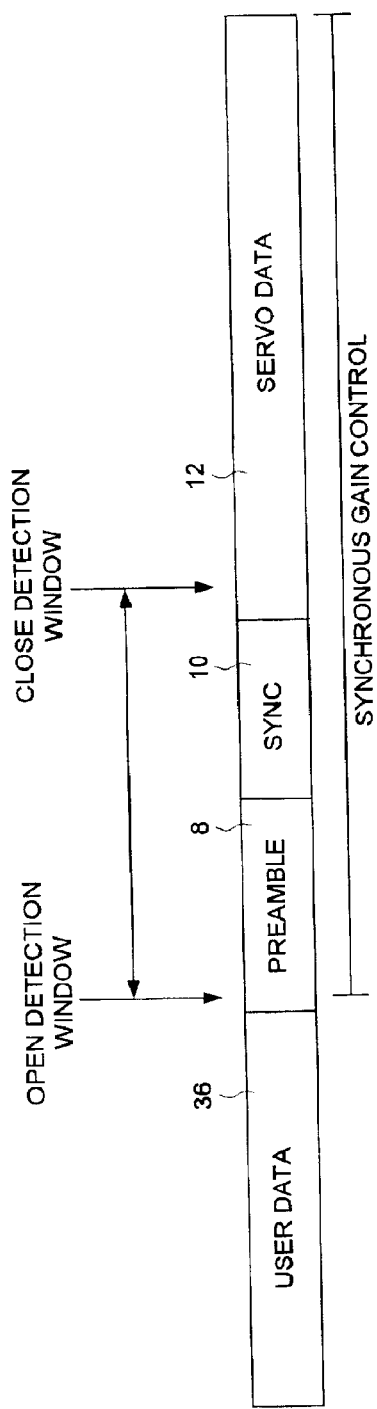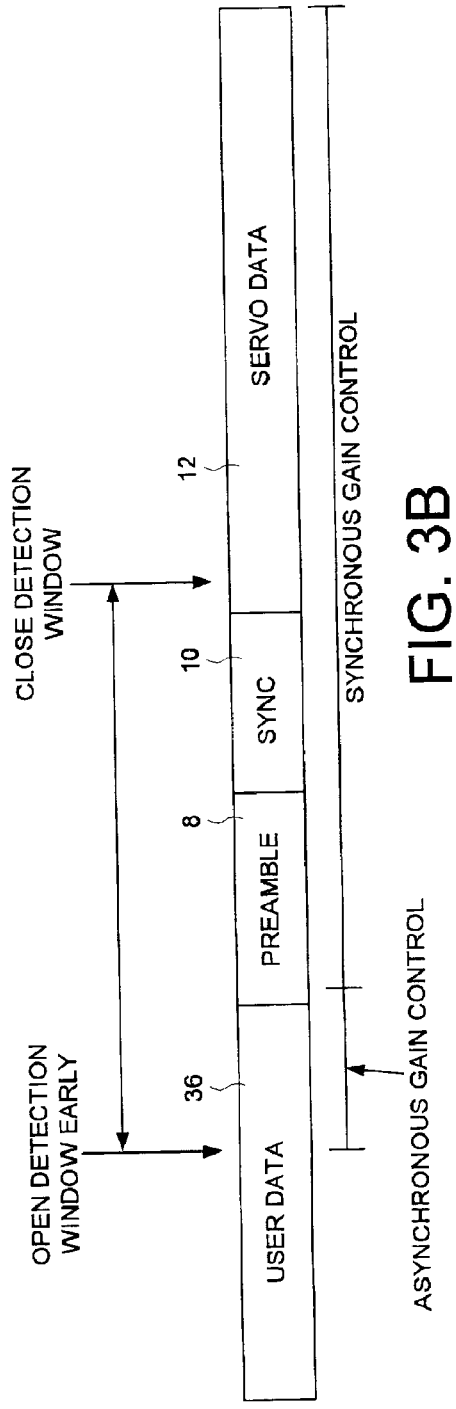

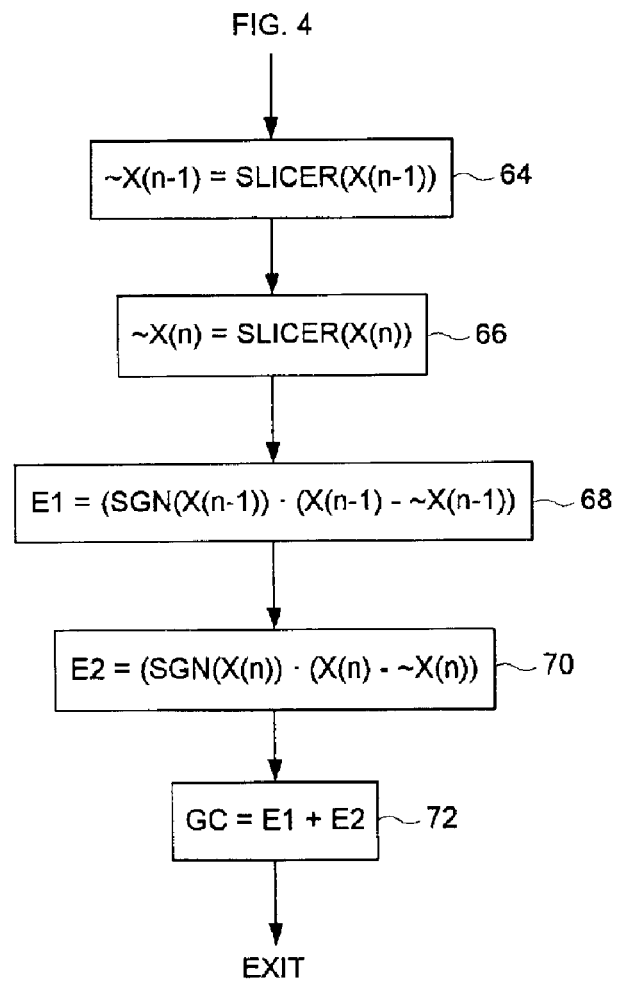

DISK DRIVE COMPRISING ASYNCHRONOUS/SYNCHRONOUS GAIN CONTROL FOR FAULT TOLERANT DETECTION OF SERVO SYNC MARK AFTER HEAD SWITCH

BACKGROUND OF THE INVENTION

1. Field of the Invention

The present invention relates to disk drives for computer systems. More particularly, the present invention relates to a disk drive comprising asynchronous/synchronous gain control for fault tolerant detection of servo sync mark after a head switch.

2. Description of the Prior Art

Disk drives may comprise multiple disks with corresponding heads for accessing a top and bottom surface of each disk. Typically only one head is active at a time for reading data from or writing data to a particular disk surface. FIG. 1 illustrates a prior art format for a disk surface 2 comprising a plurality of radially spaced, concentric tracks 4. Each track 4 comprises a plurality of data sectors and a plurality of embedded servo sectors 6. Each servo sector 6 comprises a preamble 8 for synchronizing gain control and timing recovery, a sync mark 10 for synchronizing to a data field 12 comprising coarse head positioning information such as a track number, and product servo bursts 14 which provide fine head positioning information.

When the disk drive switches the active head, it must synchronize to the embedded servo sectors 6 of the newly selected disk surface before it can perform a read or write operation. The disk drive can synchronize to the embedded servo sectors 6 once the servo sync mark 10 in one of the embedded servo sectors 6 is detected. If the embedded servo sectors 6 and heads are aligned perfectly with respect to one another, then the location of the servo sectors 6 on the newly selected disk surface after a head switch would be known relative to the previously selected disk surface. The disk drive opens a detection window where the servo sync mark 10 should occur, wherein the detection window helps prevent miss-detecting a false sync mark. However, because small misalignments occur between the disks as well as the heads, the detection window may be opened too late and the servo sync mark 10 missed. It may take several servo sectors before the servo sync mark 10 is detected.

There is, therefore, a need to improve the reliability of servo sync mark detection after a head switch to ensure fast, fault tolerant synchronization to the embedded servo sectors.

SUMMARY OF THE INVENTION

The present invention may be regarded as a disk drive comprising a plurality of disk surfaces each having a plurality of tracks, each track comprising a plurality of data sectors and a plurality of embedded servo sectors, each embedded servo sector comprising a servo sync mark for synchronizing to the embedded servo sector. The disk drive further comprises a plurality of heads actuated radially over respective disk surfaces, head selection circuitry for selecting one of the heads to perform a read or write operation, a gain control system implementing an asynchronous gain control algorithm and a synchronous gain control algorithm for controlling a gain of a read signal emanating from the selected head, and a synchronous sync mark detector for synchronously detecting the servo sync mark from the read signal. When the disk drive is synchronized to the embedded servo sectors of a first disk surface corresponding to the selected head, the synchronous sync mark detector is enabled relative to a detection window for detecting the servo sync marks recorded on the first disk surface. When the head selection circuitry selects another one of the heads corresponding to a second disk surface, the detection window is opened early to detect a servo sync mark recorded on the second disk surface. The asynchronous gain control algorithm prevents the gain control system from diverging due to the newly selected head reading an area of the second disk surface preceding the servo sync mark, and the synchronous gain control algorithm maintains a proper gain for the read signal while the newly selected head reads the servo sync mark.

In one embodiment, the asynchronous and synchronous gain control algorithms control the gain of the read signal relative to a magnitude of the read signal. In one embodiment, the asynchronous gain control algorithm controls the gain of the read signal if the read signal exceeds a threshold for a predetermined interval, and the synchronous gain control algorithm controls the gain of the read signal if the read signal does not exceed the threshold for a predetermined interval. In one embodiment, the asynchronous gain control algorithm controls the gain of the read signal if the read signal is greater than the threshold for the predetermined interval. In one embodiment, the asynchronous gain control algorithm controls the gain of the read signal if the read signal is less than the threshold for the predetermined interval.

In one embodiment, the disk drive further comprises a sampling device for sampling the read signal to generate read signal sample values. The synchronous gain control algorithm is responsive to the read signal sample values and expected sample values. The disk drive further comprises a timing recovery system for synchronizing the read signal sample values to a frequency rate of data recorded on the disk surface to generate synchronous sample values. The synchronous sync mark detector detects the servo sync mark in response to the synchronous sample values.

The present invention may also be regarded as a method of detecting a servo sync mark in a disk drive after switching between a plurality of heads. The disk drive comprises a plurality of disk surfaces each having a plurality of tracks, each track comprising a plurality of data sectors and a plurality of embedded servo sectors, each embedded servo sector comprising a servo sync mark for synchronizing to the embedded servo sector, wherein the plurality of heads are actuated radially over respective disk surfaces. While the disk drive is synchronized to the embedded servo sectors of a first disk surface corresponding to a selected head, a search for the servo sync marks recorded on the first disk surface is performed relative to a detection window. A head switch operation selects another one of the heads positioned over a second disk surface, and the detection window is opened early while searching for a servo sync mark recorded on the second disk surface. A gain of a read signal emanating from the newly selected head is controlled using an asynchronous gain control algorithm while reading an area of the second disk surface preceding the servo sync mark. The gain of the read signal emanating from the newly selected head is controlled using a synchronous gain control algorithm while reading the servo sync mark.

BRIEF DESCRIPTION OF THE DRAWINGS

FIG. 3A illustrates normal operation of the disk drive of FIG. 2 wherein the synchronous sync mark detector is enabled just prior to the head reaching the servo sync mark to help prevent miss-detecting the servo sync mark.

FIG. 3B illustrates operation of the disk drive of FIG. 2 after a head switch operation, wherein the synchronous sync mark detector is enabled early and the asynchronous gain control algorithm helps prevent the gain control system from diverging while the newly selected head reads an area of the disk surface preceding the servo sync mark.

FIG. 5 is a flow diagram according to an embodiment of the present invention for computing a synchronous gain control signal when reading the preamble and servo sync mark.

FIG. 6 shows a table for implementing a slicer used to compute expected read signal sample values for use in computing the gain control signal in the synchronous gain control algorithm.

DESCRIPTION OF THE PREFERRED EMBODIMENTS

Figure 1:
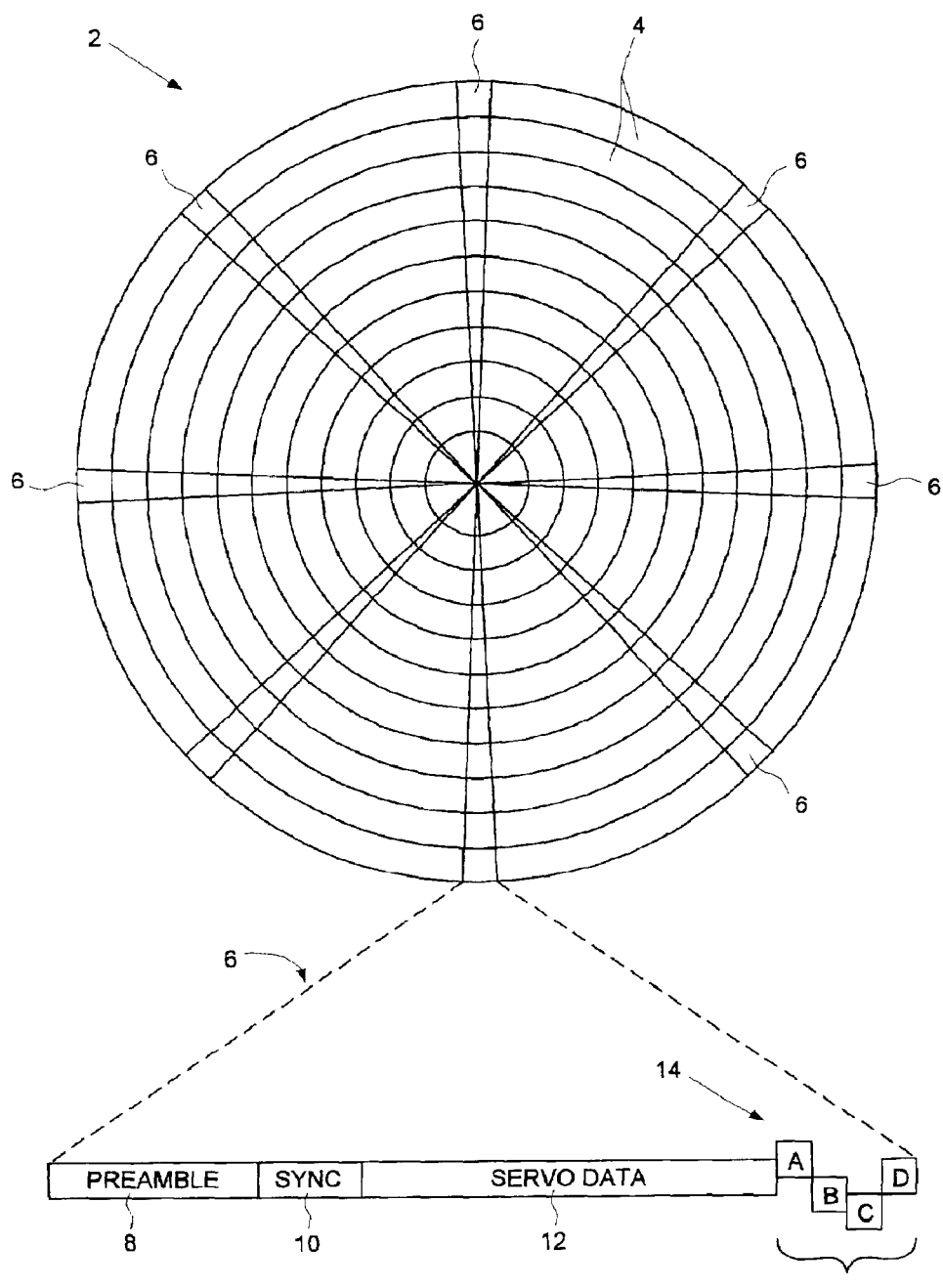
FIG. 1 shows a prior art disk format comprising a plurality of radially spaced, concentric tracks, each track comprising a plurality of data sectors and embedded servo sectors.
Figure 2:
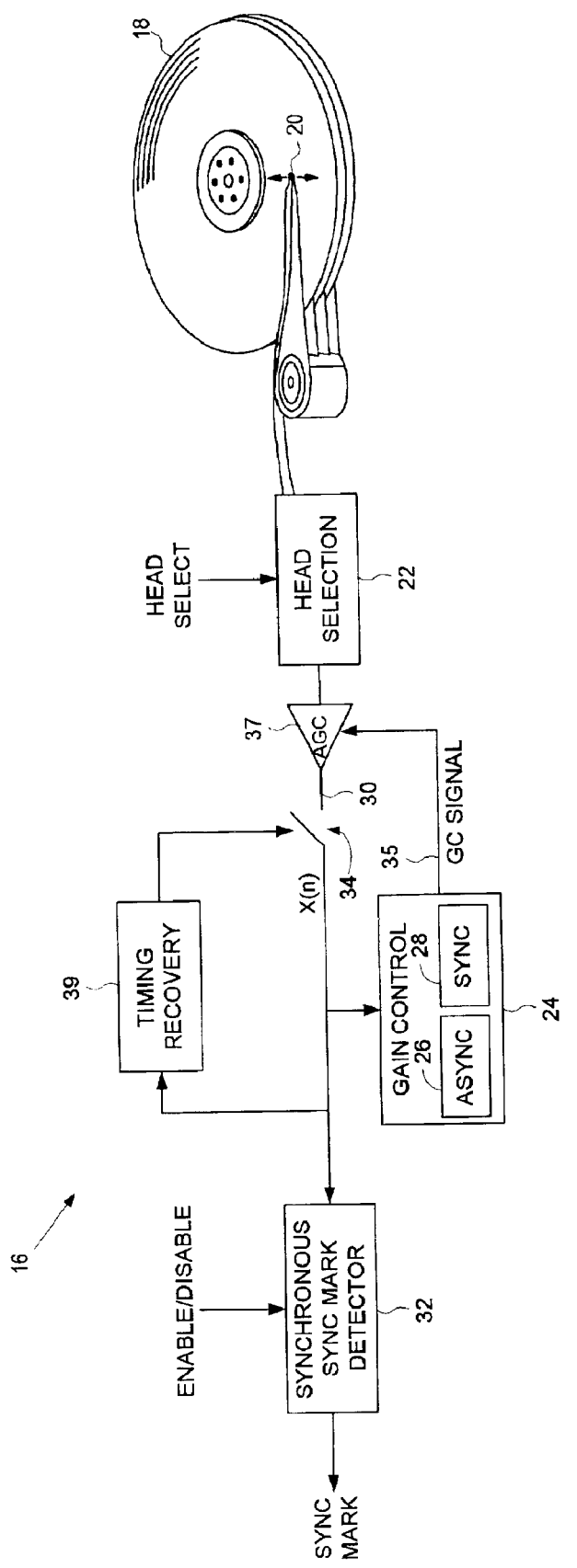
FIG. 2 shows a disk drive according to an embodiment of the present invention comprising a gain control system for adjusting the gain of a read signal using an asynchronous and synchronous gain control algorithm to facilitate fault tolerant synchronous detection of a servo sync mark after a head switch.

FIG. 2 shows a disk drive 16 according to an embodiment of the present invention comprising a plurality of disk surfaces 18 each having a plurality of tracks, each track comprising a plurality of data sectors and a plurality of embedded servo sectors, each embedded servo sector comprising a servo sync mark for synchronizing to the embedded servo sector. The disk drive 16 further comprises a plurality of heads 20 actuated radially over respective disk surfaces, head selection circuitry 22 for selecting one of the heads 20 to perform a read or write operation, a gain control system 24 implementing an asynchronous gain control algorithm 26 and a synchronous gain control algorithm 28 for controlling a gain of a read signal 30 emanating from the selected head 20, and a synchronous sync mark detector 32 for synchronously detecting the servo sync mark from the read signal 30. When the disk drive 16 is synchronized to the embedded servo sectors of a first disk surface, the synchronous sync mark detector 32 is enabled relative to a detection window for detecting the servo sync marks recorded on the first disk surface. When the head selection circuitry 22 selects another one of the heads 20, the detection window is opened early to detect a servo sync mark recorded on the second disk surface. The asynchronous gain control algorithm 26 prevents the gain control system 24 from diverging due to the newly selected head 20 reading an area of the second disk surface 18 preceding the servo sync mark, and the synchronous gain control algorithm 28 maintains a proper gain for the read signal 30 while the newly selected head 20 reads the servo sync mark.

In the embodiment of FIG. 2, the disk drive 16 comprises a sampling device 34 for sampling the analog read signal 30 emanating from the selected head 20. The gain control system 24 processes the read signal sample values X(n) to generate a gain control signal GC SIGNAL 35 for adjusting an automatic gain control (AGC) circuit 37 thereby adjusting the gain of the analog read signal 30. The synchronous sync mark detector 32 processes the gain adjusted read signal sample values X(n) to detect the servo sync mark. The disk drive 16 of FIG. 2 also includes a timing recovery system 39 for synchronizing the sampling device 34 to a frequency rate of the data recorded on the disk surface 18 to generate synchronous sample values processed by the synchronous sync mark detector 32. The timing recovery system 39 may implement any suitable timing recovery algorithm, such as sampling the read signal synchronously or interpolating asynchronous sample values to generate synchronous sample values. The synchronous sync mark detector 32 may implement any suitable synchronous detection algorithm, such as the well known Partial Response Maximum Likelihood (PRML) algorithm. Other implementation details of a sampled amplitude read channel are well known and not disclosed herein so as not to obscure the embodiments of the present invention.

FIG. 3A illustrates normal operation of the disk drive 16 of FIG. 2 when reading the servo sync mark 10 while tracking a selected disk surface 18. Because the disk drive 16 has already synchronized to the embedded servo sectors, the location of the servo sync mark 10 in the next embedded servo sector is known within a relatively high degree of certainty. Therefore the synchronous sync mark detector 32 is enabled relative to a detection window that is opened while the head 20 is over the expected location of the preamble 8 and closed just after the expected location of the servo sync mark 10 to help prevent miss-detecting a false servo sync mark. However, when the head selection circuitry 22 switches to a different head 20, the location of the servo sync mark 10 in the next embedded servo sector is known to a much lesser degree of certainty. As shown in FIG. 3B, the detection window is opened early to help ensure the servo sync mark 10 is not missed. While the newly selected head 20 is reading the area of the disk surface 18 preceding the servo sync mark 10 (e.g., while reading user data 36) the asynchronous gain control algorithm 26 prevents the gain control system 24 from diverging. When the newly selected head 20 reaches the preamble 8 of the embedded servo sector, the synchronous gain control algorithm 28 maintains a proper gain for the read signal 30 while the newly selected head 20 reads the servo sync mark 10 (and servo data 12).

Figure 4:
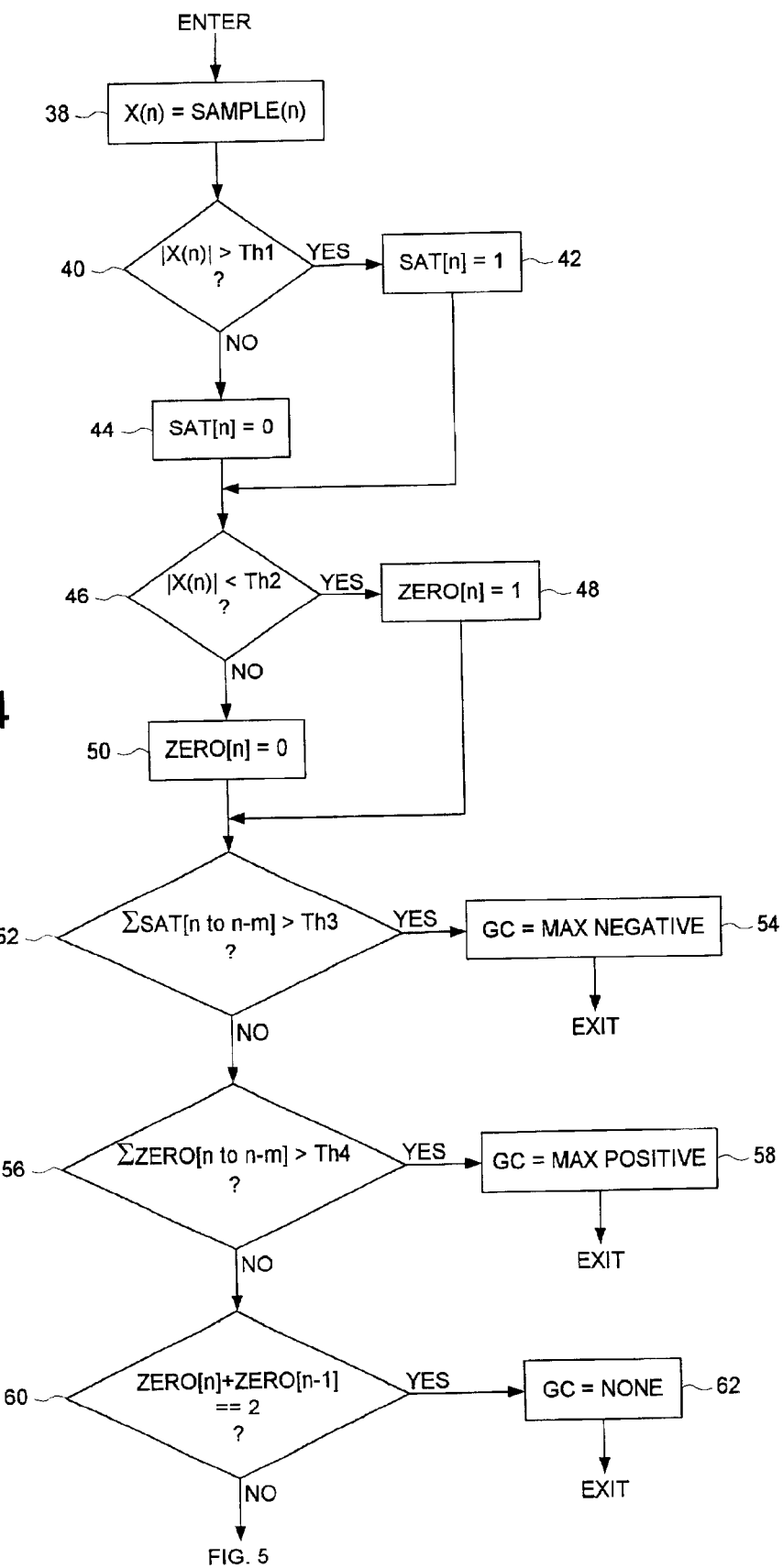
FIG. 4 is a flow diagram according to an embodiment of the present invention for computing an asynchronous gain control signal when reading the area of the disk surface preceding the servo sync mark.

FIG. 4 is a flow diagram according to an embodiment of the present invention for computing a gain control signal 35 according to the asynchronous gain control algorithm 26 when reading the area of the disk surface 18 preceding the servo sync mark 10. At step 38, a new read signal sample value X(n) is generated by the sampling device 34 sampling the analog read signal 30. If at step 40 the absolute magnitude of the read signal sample X(n) is greater than a predetermined threshold Th1, then at step 42 the nth value of an array SAT[n] is assigned a 1. Otherwise at step 44 the nth value of the array SAT[n] is assigned a 0. If at step 46 the absolute magnitude of the read signal sample value X(n) is less than a predetermined threshold Th2, then at step 48 the nth value of an array ZERO[n] is assigned a 1. Otherwise at step 50 the nth value of the array ZERO[n] is assigned a 0. If at step 52 a summation of values in the SAT array (representing a predetermined interval of the read signal) is greater than a predetermined threshold Th3, then at step 54 the gain control signal 35 is assigned a maximum negative value. In this manner, the gain of the analog read signal 30 is decreased during the next sampling interval to help prevent the gain control system 24 from "losing" the read signal 30 by adjusting the gain of the AGC 37 too high. If at step 56 a summation of values in the ZERO array (representing a predetermined interval of the read signal) is greater than a predetermined threshold Th4, then at step 58 the gain control signal 35 is assigned a maximum positive value. In this manner, the gain of the analog read signal 30 is increased during the next sampling interval to help prevent the gain control system 24 from "losing" the read signal 30 by decreasing the gain of the AGC 37 too low. If read signal sample values have not saturated or zeroed over the predetermined time interval and at step 60 the current and preceding values in the ZERO array are 1 (meaning that X(n) and X(n−1) are both less than Th2), then at step 62 no change is made to the gain control signal 35. Otherwise the gain control signal 35 is adjusted according to the synchronous gain control algorithm 28.

FIG. 5 is a flow diagram according to an embodiment of the present invention for computing a gain control signal 35 according to the synchronous gain control algorithm 28 (FIG. 2). The synchronous gain control algorithm 28 disclosed in FIG. 5 is for use in a PRML Class-IV system having a dipulse response of +1, 0, −1 such that the expected read signal sample values take on a value selected from the set [−2, 0, +2]. However, any suitable synchronous gain control algorithm may be employed in the embodiments of the present invention. At step 64 an expected sample value ~X(n−1) is computed according to a slicer algorithm shown in FIG. 6, and at step 66 an expected sample value ~X(n) is computed according to the slicer algorithm. At step 68 a first error value E1 is computed in response to the expected sample value ~X(n−1) and the read signal sample value X(n−1). At step 70 a second error value E2 is computed in response to the expected sample value X(n) and the read signal sample value X(n). At step 72 the gain control signal 35 is generated as the sum of E1 and E2. In one embodiment, only the read signal sample values having a selected polarity (positive or negative) are input into the synchronous gain control algorithm.

Referring again to FIG. 3B, the synchronous gain control algorithm 28 is enabled while reading the area of the disk surface 18 preceding the servo sync mark 10 and may adjust the gain control signal 35 during this interval. In other words, the asynchronous gain control algorithm 26 helps prevent the synchronous gain control algorithm 28 from diverging. When the newly selected head 20 reaches the preamble 8 of the embedded servo sector, the synchronous gain control algorithm 28 should eventually maintain the gain of the read signal 30 at the proper level such that the gain control signal 35 is not adjusted by the asynchronous gain control algorithm 26.

I claim:

1. A disk drive comprising:
   (a) a plurality of disk surfaces each having a plurality of tracks, each track comprising a plurality of data sectors and a plurality of embedded servo sectors, each embedded servo sector comprising a servo sync mark for synchronizing to the embedded servo sector;
   (b) a plurality of heads actuated radially over respective disk surfaces;
   (c) head selection circuitry for selecting one of the heads to perform a read or write operation;
   (d) a gain control system implementing an asynchronous gain control algorithm and a synchronous gain control algorithm for controlling a gain of a read signal emanating from the selected head; and
   (e) a synchronous sync mark detector for synchronously detecting the servo sync mark from the read signal, wherein:
   when the disk drive is synchronized to the embedded servo sectors of a first disk surface corresponding to the selected head, the synchronous sync mark detector is enabled relative to a detection window for detecting the servo sync marks recorded on the first disk surface;
   when the head selection circuitry selects another one of the heads corresponding to a second disk surface, the detection window is opened early to detect a servo sync mark recorded on the second disk surface;
   the asynchronous gain control algorithm prevents the gain control system from diverging due to the newly selected head reading an area of the second disk surface preceding the servo sync mark; and
   the synchronous gain control algorithm for maintaining a proper gain for the read signal while the newly selected head reads the servo sync mark.

2. The disk drive as recited in claim 1, wherein the asynchronous and synchronous gain control algorithms control the gain of the read signal relative to a magnitude of the read signal.

3. The disk drive as recited in claim 2, wherein:
   (a) the asynchronous gain control algorithm controls the gain of the read signal if the read signal exceeds a threshold for a predetermined interval; and
   (b) the synchronous gain control algorithm controls the gain of the read signal if the read signal does not exceed the threshold for a predetermined interval.

4. The disk drive as recited in claim 3, wherein the asynchronous gain control algorithm controls the gain of the read signal if the read signal is greater than the threshold for the predetermined interval.

5. The disk drive as recited in claim 3, wherein the asynchronous gain control algorithm controls the gain of the read signal if the read signal is less than the threshold for the predetermined interval.

6. The disk drive as recited in claim 1, further comprising a sampling device for sampling the read signal to generate read signal sample values, wherein the synchronous gain control algorithm is responsive to the read signal sample values and expected sample values.

7. The disk drive as recited in claim 1, further comprising:
   (a) a sampling device for sampling the read signal to generate read signal sample values, and
   (b) a timing recovery system for synchronizing the read signal sample values to a frequency rate of data recorded on the disk surface to generate synchronous sample values, wherein the synchronous sync mark detector is responsive to the synchronous sample values.

8. A method of detecting a servo sync mark in a disk drive after switching between a plurality of heads, the disk drive comprising a plurality of disk surfaces each having a plurality of tracks, each track comprising a plurality of data sectors and a plurality of embedded servo sectors, each embedded servo sector comprising a servo sync mark for synchronizing to the embedded servo sector, the plurality of heads actuated radially over respective disk surfaces, the method comprising the steps of:
   (a) while the disk drive is synchronized to the embedded servo sectors of a first disk surface corresponding to a selected head, searching for the servo sync marks recorded on the first disk surface relative to a detection window;
   (b) selecting another one of the heads positioned over a second disk surface;

(c) opening the detection window early while searching for a servo sync mark recorded on the second disk surface;

(d) controlling a gain of a read signal emanating from the newly selected head using an asynchronous gain control algorithm while reading an area of the second disk surface preceding the servo sync mark; and (e) controlling the gain of the read signal emanating from the second head using a synchronous gain control algorithm while reading the servo sync mark.

9. The method as recited in claim 8, wherein the gain of the read signal emanating from the second head is controlled by the asynchronous and synchronous gain control algorithms relative to a magnitude of the read signal.

10. The method as recited in claim 9, wherein:

(a) the asynchronous gain control algorithm controls the gain of the read signal if the read signal exceeds a threshold for a predetermined interval; and (b) the synchronous gain control algorithm controls the gain of the read signal if the read signal does not exceed the threshold for a predetermined interval.

11. The method as recited in claim 10, wherein the asynchronous gain control algorithm controls the gain of the read signal if the read signal is greater than the threshold for the predetermined interval.

12. The method as recited in claim 10, wherein the asynchronous gain control algorithm controls the gain of the read signal if the read signal is less than the threshold for the predetermined interval.

13. The method as recited in claim 8, further comprising the step of sampling the read signal to generate read signal sample values, wherein the synchronous gain control algorithm is responsive to the read signal sample values and expected sample values.

14. The method as recited in claim 8, further comprising the steps of:

(a) sampling the read signal to generate read signal sample values; and (b) synchronizing the read signal sample values to a frequency rate of data recorded on the disk surface to generate synchronous sample values, wherein the servo sync mark is detected in response to the synchronous sample values.

* * * * *